US008583488B2

(12) United States Patent
Janos et al.

(10) Patent No.: US 8,583,488 B2
(45) Date of Patent: Nov. 12, 2013

(54) GENERATING ADVERTISEMENTS USING USER ASSETS

(75) Inventors: Joseph Janos, New York, NY (US); Karen Padham Taylor, Los Gatos, CA (US); Graham Jenkin, San Francisco, CA (US); Nicolae Crucian, New York, NY (US); Ryan Dunn, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 1290 days.

(21) Appl. No.: 11/856,437

(22) Filed: Sep. 17, 2007

(65) Prior Publication Data

US 2009/0076901 A1 Mar. 19, 2009

(51) Int. Cl.
*G06Q 30/00* (2012.01)

(52) U.S. Cl.
USPC ........................................................ 705/14.72

(58) Field of Classification Search
USPC ................................... 705/14.4, 14.49, 14.72
See application file for complete search history.

(56) References Cited

U.S. PATENT DOCUMENTS

| 5,283,731 | A | 2/1994 | Lalonde et al. |
| 5,412,416 | A | 5/1995 | Nemirofsky |
| 5,448,625 | A | 9/1995 | Lederman |
| 5,721,827 | A | 2/1998 | Logan et al. |
| 5,724,521 | A | 3/1998 | Dedrick |
| 5,740,549 | A | 4/1998 | Reilly et al. |
| 5,819,092 | A | 10/1998 | Ferguson et al. |
| 5,848,396 | A | 12/1998 | Gerace |
| 5,848,397 | A | 12/1998 | Marsh et al. |
| 5,948,061 | A | 9/1999 | Merriman |
| 5,974,451 | A | 10/1999 | Simmons |
| 6,014,698 | A | 1/2000 | Griffiths |
| 6,026,368 | A | 2/2000 | Brown et al. |
| 6,026,369 | A | 2/2000 | Capek |
| 6,044,376 | A | 3/2000 | Kurtzman, II |
| 6,078,914 | A | 6/2000 | Redfern |
| 6,112,192 | A | 8/2000 | Capek |
| 6,134,532 | A | 10/2000 | Lazarus et al. |
| 6,144,944 | A | 11/2000 | Kurtzman, II et al. |
| 6,167,382 | A | 12/2000 | Sparks et al. |
| 6,188,398 | B1 | 2/2001 | Collins-Rector et al. |
| 6,205,432 | B1 | 3/2001 | Gabbard et al. |
| 6,216,112 | B1 | 4/2001 | Fuller et al. |
| 6,269,361 | B1 | 7/2001 | Davis et al. |

(Continued)

FOREIGN PATENT DOCUMENTS

| KR | 2000-0037278 | 7/2000 |
| KR | 10-2005-0104319 | 11/2005 |
| WO | WO 97/21183 | 6/1997 |
| WO | WO 01/44992 | 6/2001 |

OTHER PUBLICATIONS

PCT International Search Report, Application No. PCT/US2008/076665, filed Sep. 17, 2008.

(Continued)

*Primary Examiner* — Naresh Vig
(74) *Attorney, Agent, or Firm* — Fish & Richardson P.C.

(57) ABSTRACT

The present disclosure is directed to a system and method for generating ads using user assets. In some implementations, a method includes receiving one or more assets associated with advertising in at least one printed publication. One or more ads compatible with ad slots in the at least one publication are automatically generated based, at least in part, on the received assets.

11 Claims, 7 Drawing Sheets

(56) References Cited

U.S. PATENT DOCUMENTS

| | | | |
|---|---|---|---|
| 6,285,987 | B1 | 9/2001 | Roth et al. |
| 6,286,045 | B1 | 9/2001 | Griffiths et al. |
| 6,308,202 | B1 | 10/2001 | Cohn et al. |
| 6,360,215 | B1 | 3/2002 | Judd et al. |
| 6,385,592 | B1 | 5/2002 | Angles et al. |
| 6,401,075 | B1 | 6/2002 | Mason et al. |
| 6,449,657 | B2 | 9/2002 | Stanbach, Jr. et al. |
| 6,604,087 | B1 | 8/2003 | Kolls |
| 6,633,850 | B1 | 10/2003 | Gabbard et al. |
| 6,654,725 | B1 | 11/2003 | Langheinrich et al. |
| 6,810,356 | B1 | 10/2004 | Garcia-Franco et al. |
| 6,985,882 | B1 | 1/2006 | Del Sesto |
| 7,027,178 | B2 | 4/2006 | Satomi et al. |
| 7,038,637 | B1 * | 5/2006 | Eller et al. ............ 345/2.1 |
| 7,039,599 | B2 | 5/2006 | Merriman |
| 7,136,875 | B2 | 11/2006 | Anderson et al. |
| 7,184,971 | B1 | 2/2007 | Ferber |
| 8,132,097 | B2 * | 3/2012 | Angell ............ 715/243 |
| 2002/0194070 | A1 * | 12/2002 | Totham et al. ............ 705/14 |
| 2002/0194215 | A1 * | 12/2002 | Cantrell et al. ............ 707/500 |

OTHER PUBLICATIONS

AdStar Website from 1997—Archive (43 pages) http://web.archive.org/web/19970412171433/www.adstar.com/about.html.

AdForce User Guide—Manual from 1998, 285 pages, copyright AdForce, 10101 N. De Anza Boulevard, Cupertino, CA 95014.

AdStar User Guide—Windows User's Manual from 1999, 31 pages.

H. Goodman, "Web Sites Contain Plenty of Option for Online Ad Taking", from Travidia website, dated Jul. 2, 2008 (2 pages), http://www.travidia.com/news/plentyoptions.asp.

U.S. Appl. No. 95/001,073, Reexamination of Stone et al., filed Sep. 30, 2004.

U.S. Appl. No. 95/001,061, Reexamination of Stone et al., filed Sep. 3, 2002.

U.S. Appl. No. 95/001,069, Reexamination of Dean et al., filed Jul. 11, 2002.

U.S. Appl. No. 95/001,068, Reexamination of Stone et al., filed Dec. 7, 2002.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073, Jul. 30, 2008.

Request for Reexamination of U.S. Patent No. 6,446,045 B1, Control No. 95/001,061, Jul. 7, 2008.

Request for Reexamination of U.S. Patent No. 7,249,059 B2, Control No. 95/001,069, Jul. 21, 2008.

Request for Reexamination of U.S. Patent No. 6,829,587 B2, Control No. 95/001,068, Aug. 15, 2006.

* cited by examiner

FIG. 2A

Provide ad content

If you need to, you can submit a description of your ads to the publisher now and deliver the ad itself later. If your offers are accepted, we'll email you asking for your PDF file(s) by the ad creative deadline. Learn more — 202

Common Questions
Must I provide an ad now? (no)
What file formats can I upload?

TODO (flooey) How can I build my ad?
TODO (flooey) What success have print advertisements seen?

| Newspaper | Ad size (width x height) | Issue dates | Ads | Options (You can choose to provide ads later) |
|---|---|---|---|---|
| Boston Globe "Travel" section, for Sun, Wed _204_ | 2 col. x 3.5 in. (3.79 in. x 3.5 in.) _206_ | Nov 16-30, 2007 (4 issues) | Cruise.com.pdf _207_ | Edit ad \| Remove Ad _208_ |
| Houston Chronicle "Travel" section, for Sun | 2 col. x 5.25 in. (3.75 in. x 5.25 in.) | Nov 16-30, 2007 (2 issues) | *No file selected* | Upload ad \| Create ad now _210_ |

FIG. 2B

Create a new ad | View all ads (19)

How it works

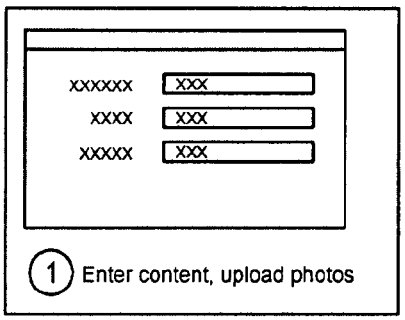
① Enter content, upload photos

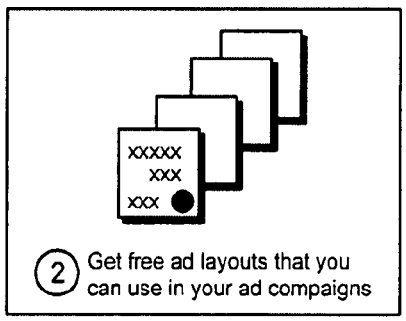
② Get free ad layouts that you can use in your ad compaigns

Ad name:* [_____] (25 chars. max)
Headline:* [_____] (25 chars. max)
Company name:* [_____] (25 chars. max)
Body text (short): [_____] (70 chars. max)
Body text (medium): [_____] (140 chars. max)  } 212
Some templates use an optional longer description
Body text (long): [_____] (210 chars. max)
Some templates use an optional longer description Primary contact:* [Web address ▼]
http://* [_____]  } 214

Secondary contact: [Web address ▼]
http:// [_____]
Upload a company logo: [_____] [Browse...]  } 216
Upload an image for your ad: [_____] [Browse...]
Note: images can be adjusted later
All ads must comply with Google's editorial guidelines and technical guidelines. Please note that colored images or images submitted in CMYK or RGB will be converted to greyscale.

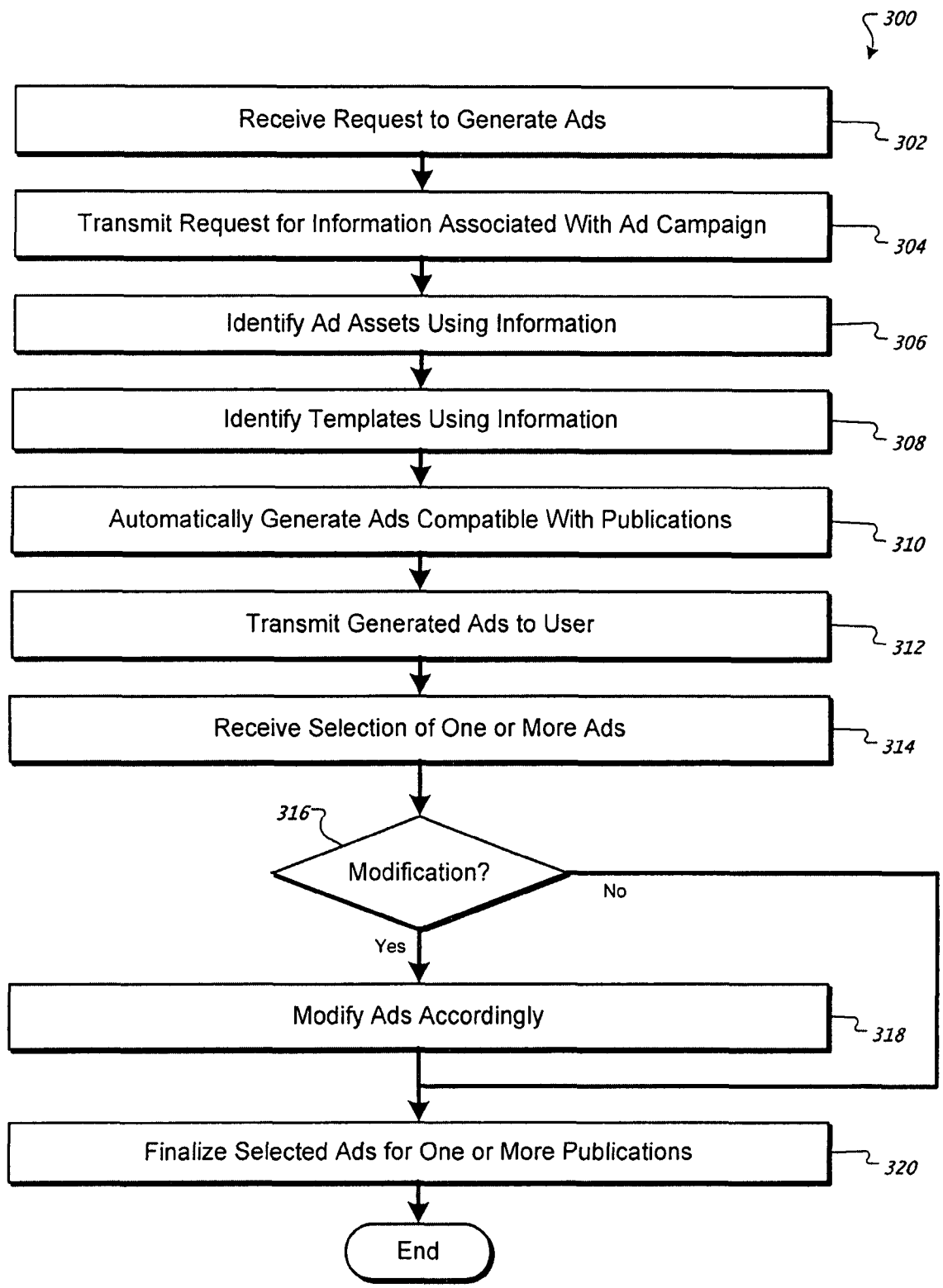

GENERATING ADVERTISEMENTS USING USER ASSETS

TECHNICAL FIELD

This invention relates to advertising.

BACKGROUND

Content delivery over the internet continues to improve every day. Computer users can receive e-mail, news, games, entertainment, music, books, and web pages—all with a simple Internet connection (and with improved quality on a broadband connection). Internet users also have access to a plethora of services such as maps, shopping links, images, blogs, local search, satellite images, group discussions, hosted content, and e-mail. While many of these services are free to users, such services are often accompanied by an advertisement that helps service providers defray the cost of providing these services. In addition, the advertisement may also add value to the user experience.

SUMMARY

The present disclosure is directed to a system and method for generating ads using user assets. In some implementations, a method includes receiving one or more assets associated with advertising in at least one printed publication. One or more ads compatible with ad slots in the at least one publication are automatically generated based, at least in part, on the received assets.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A-E are example displays illustrating example graphical user interfaces for generating ads in the advertising system of FIG. 1; and FIG. 3 is a flow chart illustrating an example method for generating ads in accordance with some implementations of the present disclosure.

Like reference symbols in the various drawings indicate like elements.

DETAILED DESCRIPTION

Figure 1:
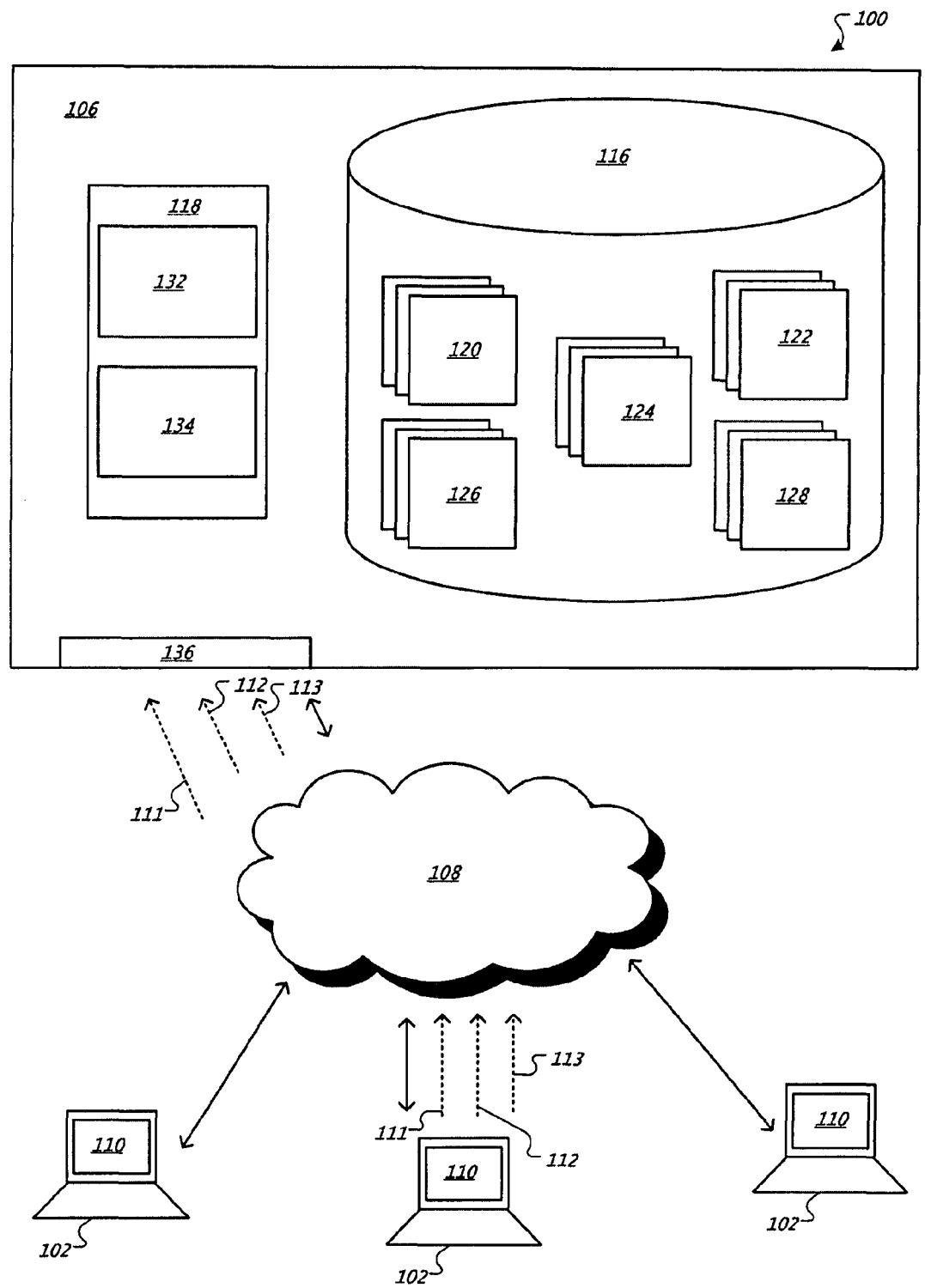
FIG. 1 is a block diagram illustrating an example advertising system in accordance with some implementations of the present disclosure.

FIG. 1 is a block diagram illustrating an example system 100 for creating advertisements for print publications. For example, the system 100 may receive ad assets (e.g., text, images) from users and generate printable ads compatible with one or more publications. Ad assets may include elements that may be incorporated into an ad such as graphical elements (e.g., text, images), audio elements, and/or other elements. While the following discussion is directed to print publications, the system 100 may automatically generate ads for other media such as Web pages, radio, television, and/or others that may have varying ad requirements. Print publications may include newspapers, magazines, and/or other tangible documents that often have specifications for advertisement ("ad") slots such as size, format, and/or other attributes.

In some implementations, the system 100 can automatically generate ads compatible with different publications using received assets and predefined templates. For example, the system 100 may receive assets (e.g., company name, contact information, slogan, images) from a user and automatically populate one or more predefined templates based, at least in part, on one or more selections of the users. In generating the ads, the system 100 can, in some implementations, modify parameters of the received assets such as font size, font tripe, cropping, as well as other parameters. In addition, the system 100 may receive a selection for ad sizes, certain publications, ad slots in certain publications, and/or others. In response to at least these selections, the system 100 may automatically generate ads compatible with one or more ad slots using the received assets. For example, the system 100 may generate a plurality of ads with different arrangements, orientations, and/or relative sizing using one or more of the received assets. In doing so, the system 100 may eliminate, minimize, or otherwise reduce the amount of manual reformatting for each publication.

At a high level, the system 100 can, in some implementations, include clients 102 and an ad server 106 coupled via network 108. In this implementation, the client 102 includes a Graphical User Interface (GUI) 110 for displaying information from the ad server 106. The ad server 106 includes a memory 116 and a processor 118. The memory 116 locally stores asset profiles 120 for identifying received assets, template profiles 122 for defining predefined templates for ad slots, publication profiles 124 for identifying ad specifications for publications, ads 126, and web pages 128 for receiving and/or displaying information associated with advertising. The processor 120 includes request engine 132 for requesting information (e.g., assets, template selections) from users and ad engine 134 for automatically generating ads 126 using received assets and template profiles 122. Turning to a high level description of the operation of the illustrated tracking system 100, the client 102 transmits a request to the ad server 106 for a Web page 128 for display through the GUI 110. The GUI 110 presents the Web page 128 and receives information provided by the user. For example, the user may provide ad assets using the displayed Web page 128. In response to at least the ad assets, the request engine 132 generates and/or updates one or more asset profiles 120. In addition, the request engine 132 may determine information identifying ad slots, publication, templates, and/or other information. In response to receiving one or more selections, the ad engine 134 automatically generates one or more ads 126 compatible with one or more publications based, at least in part, on received assets and templates 122.

Turning to a more detailed description of the elements, the clients 102 are any devices (e.g., computing devices) operable to connect or communicate with ad server 106 or network 108 using any communication link. Each client 102 includes, executes, or otherwise presents the GUI 110 and comprises an electronic device operable to receive, transmit, process and store any appropriate data associated with system 100. While the illustrated implementation includes three clients 102, system 100 may include any number of clients 102 communicably coupled to ad server 106. Further, "client 102," "user" and "advertiser" may be used interchangeably as appropriate without departing from the scope of this disclosure. Moreover, for ease of illustration, each client 102 is described in terms of being used by one user. But this disclosure contemplates that many users may use one device or that one user may use multiple devices.

As used in this disclosure, a user of client 102 is any advertiser, person, department, organization, small business, enterprise, or any other entity that may use or request others to use system 100. Client 102 is intended to encompass a personal computer, touch screen terminal, workstation, network computer, kiosk, wireless data port, smart phone, personal data assistant (PDA), one or more processors within these or other devices, or any other suitable processing or electronic device used by an advertiser to access the network 108. For example, client 102 may be a PDA operable to wirelessly connect with an external or unsecured network. In another example, client 102 may comprise a laptop that includes an input device, such as a keypad, touch screen, mouse, or other device that can accept information, and an output device that conveys information associated with an advertisement of ad server 106, including digital data, visual information, or GUI 110. Both the input device and output device may include fixed or removable storage media such as a magnetic computer disk, CD-ROM, or other suitable media to both receive input from and provide output to users of clients 102 through the display, namely the client portion of GUI 110.

GUI 110 comprises a graphical user interface operable to allow the user of client 102 to interface with at least a portion of system 100 for any suitable purpose, such as creating advertisements. Generally, GUI 110 provides the particular user with an efficient and user-friendly presentation of data provided by or communicated within system 100. GUI 110 may comprise a plurality of customizable frames or views having interactive fields, pull-down lists, and buttons operated by the user. For example, GUI 110 is operable to display ad assets, ad templates, generated ads 126, and/or other information associated with creating ads. For example, the GUI 110 may present a plurality of template profiles 122 populated with received assets. GUI 110 can be configurable, supporting a combination of tables, graphs (bar, line, pie, status dials, etc.), texts and images. The term graphical user interface may be used in the singular or in the plural to describe one or more graphical user interfaces and each of the displays of a particular graphical user interface. Indeed, reference to GUI 110 may indicate a reference to the front-end or a component of request engine 132, as well as the particular interface accessible via client 102, as appropriate, without departing from the scope of this disclosure. Therefore, GUI 110 may be any graphical user interface, such as a generic web browser or touch screen, that processes information in system 100 and efficiently presents the results to the user. The client 102 may transmit data to the ad server 106 through a the web browser (e.g., Microsoft Internet Explorer or Netscape Navigator) and return the appropriate HTML or XML responses to the browser using network 108, such as ads 126.

Ad server 106 comprises an electronic computing device operable to receive, transmit, process and store data associated with system 100. System 100 can be implemented using computers other than servers, as well as a server pool. Indeed, ad server 106 may be any computer, electronic or processing device such as, for example, a blade server, general-purpose personal computer (PC), Macintosh workstation, Unix-based computer, or any other suitable device. In other words, system 100 may include computers other than general purpose computers as well as computers without conventional operating systems. Ad server 106 may be adapted to execute any operating system including Linux, UNIX, Windows Server, or any other suitable operating system. In certain implementations, ad server 106 may also include or be communicably coupled with a web server and/or a mail server.

Ad server 106 includes memory 116 and a processor 118. Memory 116 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, memory 116 includes asset profiles 120, template profiles 122, publication profile 124, ads 126, and web pages 128, but may include other information without departing from the scope of this disclosure. Local memory 116 may also include any other appropriate data such as applications or services, firewall policies, a security or access log, print or other reporting files, HTML files or templates, data classes or object interfaces, child software applications or sub-systems, and others.

Asset profiles 120 can include one or more entries or data structures that includes or otherwise identifies assets associated with advertising. For example, the asset profile 120 may include text, images, and/or other assets that an advertiser may want to display in an ad. In regards to text assets, the asset profile 120 may include or identify text assets such as, for example, an enterprise name, a contact information, descriptive language about a product and/or service, a headline, and/or any other text that the advertiser may want to include in an ad. In regards to images, the asset profile 120 may also include or otherwise identify image assets such as, for example, a company logo, a product/service image, related graphics, and/or any other image that the advertiser may want to include in an ad. In addition, the asset profile 120 may identify information associated with an ad campaign such as publications, ad slots, template profiles 122, and/or other aspects. In some implementations, the asset profiles 120 can include one or more of the following formats: bitmap, Joint Photographic Experts Group (JPEG), Tagged Image File Format (TIFF), Portable Network Graphics (PNG), Graphics Interchange Format (GIF), Post Script (PS), Encapsulated Post Script (EPS), Portable Document File (PDF), and/or others. The asset profile 120 may be associated with a single advertiser, multiple advertisers, a single ad campaign, and/or multiple ad campaigns, or multiple asset profiles 120 may be associated with a single advertiser and/or a single ad campaign.

Asset profile 120 may also include or otherwise identify user-specified information associated with an ad. For example, the asset profile 120 may identify aspects of an asset, how an asset may be displayed in an advertisement, one or more selected templates 122, selected publications, and/or other selected aspects. In some implementations, an asset profile 120 may include data labels (e.g., "headline", "contact information", "logo", "body text") for each asset. In some implementations, an asset profile 120 may identify a "live area" of a particular image asset, where the live area is the part of the image that must be displayed in the ad (e.g., an essential part of the image). For example, if a particular image asset is a picture of an advertiser's product (e.g., a car) in a product environment (e.g., a highway), the asset profile may identify the live area as at least a portion of the product. In some implementations, asset profile 120 may identify a range of acceptable parameters for cropping and/or scaling an image. For example, the asset profile 120 may identify particular size for an image asset, whether an image may be cropped and/or other information. In addition, the asset profile 120 may identify tracking information associated with an ad campaign. For example, the asset profile 120 may include or identify conversions associated with previously generated ads in an ad campaign. In some implementations, the asset profile 120 may identify or include information that identifies one or more of the following parameters: responses, conversions, ad identifier, template identifier, a publisher, publication, date, time, and/or other information associated with previously presented ads.

Template profiles 122 include any parameters, variables, policies, algorithms, instructions, settings, and/or rules for ad templates. For example, the template profile 122 may define a layout and/or design characteristics for ads. In some implementations, template profile 122 may define layout and/or design characteristics for creating an ad 126 as well as transformation rules for defining attributes of an asset (e.g., size). For example, template profile 122 may define asset orientation rules, asset placement rules, font types, font scaling rules, image transformation rules (e.g., scaling rules, cropping rules), and/or other settings for generating ads 126 using received assets. Of course, the above parameters are for example purposes, and the template profile 122 may include some, none, or different rules for generating ads without departing from the scope of this disclosure. In some implementations, the template profile 122 can include fields with corresponding asset types (e.g. headline, logo, company name, contact information). For example, the template profile 122 may include a logo field, a headline field, and a company-name field as well as information identifying the layout of each element. In some implementations, the template profile 122 can include optional elements. For example, the template profile 122 may include an optional contact-information element that is only populated when contact information is provided. In some implementations, the template profile 122 may define some element parameters in a size-independent but size-relative manner. For example, the template profile 122 may define how a particular text asset, such as a headline element should be formatted and displayed (e.g., alignment, font type, word wrap, etc.) while the font size (e.g., 10 point, 12 point) is defined relative to the ad size (e.g. 1.5 inches by 2 inches). In some implementations, the template profile 122 may include transformation rules for placing, sizing, scaling, and/or cropping an image attribute. For example, the template profile 122 may identify a transformation rule indicating the placement (e.g., top left corner) and size (e.g., 0.5 inches by 0.5 inches) for an image asset when applied to a particular ad size (e.g., 1.5 inches by 2 inches) or range of ad sizes. By including transformation rules, the template profiles 122 can, in some implementations, prevent or reduce the amount of manual reformatting of an image asset for different publications. In some implementations, each template profile 122 is associated with at least one ad slot of a publication.

Publication profiles 124 include any parameters, pointers, variables, algorithms, instructions, rules, files, links, or other data for identifying specifications for ad slots in publications. For example, the publication profile 124 may identify one or more sizes for ad slots in a publication (e.g., New York Times). In some implementations, the publication profiles 124 may include or otherwise identify one or more of the following attributes of an ad slot: size, amount of text, publication date, publication, section in publication (e.g., News, Sports, Home & Garden), location, type of advertisement (e.g., For-Profit, Non-Profit, Government), and/or other aspects associated with an advertisement and/or publication. For example, publication profile 124 may identify a newspaper, sections, sizes, days, rate cards, and other parameters associated with advertising in the newspaper. In some implementations, publication profile 124 identifies different size options for a given publication. For instance, publication profile 124 may indicate that an advertiser may purchase one or more ad slot sizes (e.g. 1 column by 2 inches, 3 inches by 1.5 inches). Each publication profile 124 may be associated with a specific publisher, a specific publication, and/or a plurality of publication profiles 124 may be associated with a single publisher or a single publication.

Ads 126 include any parameters, pointers, variables, algorithms, instructions, rules, files, links, or other data including or otherwise identifying one or more printed ads for publications. For example, the ad 126 may be an image of an ad including received assets in one or more layouts. In some implementations, ad 126 may include assets from asset profile 120 formatted, oriented, and/or arranged according to template profile 122. In some implementations, the ad 126 may include assets sized, scaled and/or cropped according to template profile 122 and/or user selections. The ad 126 may also refer to the printed advertisement in a publication (e.g. newspaper, magazine). In a specific example, an ad 126 may be an advertisement for goods and/or services in a newspaper. The ads 126 may be in one or more file formats such as bitmap, JPEG, TIFF, PNG, GIF, PS, EPS, PDF, and/or any others.

Asset profiles 120, template profiles 122, publication profile 124, and/or ads 126 (pointers) may be stored in one or more tables stored in a relational database described in terms of SQL statements or scripts. In some embodiments, the asset profiles 120, template profiles 122, publication profile 124, and/or ads 126 may be formatted, stored, or defined as various data structures in text files, XML documents, VSAM files, flat files, Btrieve files, CSV files, internal variables, or one or more libraries. In short, asset profiles 120, template profiles 122, publication profile 124, and/or ads 126 may comprise one table or file or a plurality of tables or files stored on one computer or across a plurality of computers in any appropriate format. Moreover, asset profiles 120, template profiles 122, publication profile 124, and/or ads 126 may be local or remote without departing from the scope of this disclosure and store any type of appropriate data.

Web pages 128 comprise displays through which information associated with asset profiles 120, template profiles 122, publication profiles 124, and ads 126 can be presented to users of clients 102. In general, Web pages 128 include any machine readable and machine storable work product that may generate or be used to generate a display through GUI 110. Web pages 128 may be a file, a combination of files, one or more files with embedded links to other files, or any other suitable configuration. Web pages 128 may include text, audio, image, video, animation, and other attributes. In short, Web pages 128 comprise any source code or object code for generating a display that provides information for enabling users to design, format, and create ads 126 for publications. For example, the Web page 128 may be a form with fields, graphical buttons, and/or other elements that enable the user to provide or otherwise identify one or more assets to the ad server 106. Web page 128 may be written in or based on any suitable programming language such as JavaScript.

Processor 118 executes instructions and manipulates data to perform operations of ad server 106. Although FIG. 1 illustrates a single processor 118 in server 106, multiple processors 118 may be used according to particular needs, and reference to processor 118 is meant to include multiple processors 118 where applicable. In the illustrated implementation, processor 118 executes request engine 132 and ad engine 134 at any appropriate time such as, for example, in response to a request or input from a user of server 106 or any appropriate computer system coupled with network 108. The request engine 132 can include any software, hardware, and/or firmware, or combination thereof, operable to request information including assets from the user. For example, the request engine 132 may transmit Web pages 128 requesting assets for populating one or more template profiles 122. In some implementations, the request engine 132 may execute one or more of the following: receive request to generate one or more ads 126; transmit one or more Web pages 128 to the client 102 to request information associated with the ad campaign; generate and/or update one or more asset profiles 120 with the received information; identify one or more template profiles 122 selected or otherwise identified by the user; generate and/or update one or more publication profiles 124 associated with printed publications and/or others. In response to at least receiving information identifying one or more publications, the request engine 132 may identify one or more publication profiles 124 using the information and identify one or more ad slots. For example, if the user selects Publication A, request engine 132 may identify that 2.5 inches by 3.25 inches is an appropriate ad size, based on the publication profile 124 associated with Publication A. In response to at least receiving information identifying one or more ad slots (e.g., ad sizes), the request engine 132 may identify one or more publications based, at least in part, on the information and the one or more publication profiles 124. For example, if the user selects an a size of 2.5 inches by 3.25 inches, the request engine 132 may identify Publication A as a possible venue for the ad slot based, at least in part, on the publication profile 124 associated with Publication A. In addition, the request engine 132 may also receive information associated with other parameters such as asset data, live area data, cropping rules, scaling rules and/or others. In accordance with the received information, the request engine 132 may identify one or more template profiles 122 suitable for presenting the received assets. For example, the request engine 132 may identify template profiles 122 that map the received assets to associated fields. In some implementations, the request engine 132 can update asset profiles 120 with identified publications, ad slots, templates, and/or other determined information.

Ad engine 134 can include any software, hardware, and/or firmware, or combination thereof, operable to automatically generate print ads using user assets. For example, the ad engine 134 may automatically generate ads for different ad slots compatible with one or more publications. In general, the ad engine 134 may execute one or more of the following: identifying one or more template profiles 122 selected by the user; automatically populating the template profiles 122 with the received assets; presenting the generated ads 126 to the user through GUI 110; and/or others. In regards to identifying profiles 122, the ad engine 134 may identify information in asset profiles 120 associated with the user and, using the identified information, identify one or more template profiles 122 in accordance with the user selections. In generating the ads 126, the ad engine 134 may identify the received assets based on at least the asset profiles 120 associated with the user and map or otherwise associate the assets to fields in the identified templates 122. In some implementations, the ad engine 134 may apply transformation rules to the assets in accordance with user selections. For example, the ad engine 134 may identify a size for a template profile 122 and adjust attributes of the assets such as font size and/or image size. In some implementations, the ad engine 134 may populate a template with assets from an asset profile 120 and implement transformation rules, formatting rules, cropping rules, scaling rules, orientation rules, and/or otherwise adjust assets in accordance with template profile 122 and publication profile 124. In some implementations, the ad engine 134 may generate a final version (e.g., PDF) of an ad 126. In some implementations, the ad engine 134 may generate sample versions (e.g., PDF) of an ad 126 prior to the user finalizes the ad 126. The ad engine 134 can, in some implementations, generate multiple ads 126 containing the same assets and general layout for different ad slots corresponding to the specifications of different publications. For example, the ad engine 134 may use the publication profile 122 associated with Publication A to generate a 2-inch-by-2-inch ad 126 and the publication profile 122 associated with Publication B to generate a 2-inch-by-2.2-inch ad 126. In this example, both ads 126 may have the same assets and the layout but include different attributes such as font sizes and image sizes. In some implementations, the ad engine 134 may automatically generate a new ad 126 based, at least in part, on a previously generated ad 126. In this case, the ad engine 134 may automatically modify attributes of the included assets to generate the new ad 126.

Regardless of the particular implementation, "software," as used herein, may include software, firmware, wired or programmed hardware, or any combination thereof as appropriate. Indeed, request engine 132 and ad engine 134 may be written or described in any appropriate computer language including C, C++, Java, J#, Visual Basic, assembler, Perl, any suitable version of 4GL, as well as others. It will be understood that while request engine 132 and ad engine 134 are illustrated in FIG. 1 as including individual modules, each of request engine 132 and ad engine 134 may include numerous other sub-modules or may instead be a single multi-tasked module that implements the various features and functionality through various objects, methods, or other processes. Further, while illustrated as internal to server 106, one or more processes associated with request engine 132 and/or ad engine 134 may be stored, referenced, or executed remotely. Moreover, request engine 132 and/or ad engine 134 may be a child or sub-module of another software module or enterprise application (not illustrated) without departing from the scope of this disclosure.

Ad server 106 may also include interface 136 for communicating with other computer systems, such as clients 102, over network 108 in a client-server or other distributed environment. In certain implementations, ad server 106 receives data from internal or external senders through interface 136 for storage in memory 116 and/or processing by processor 118. Generally, interface 136 comprises logic encoded in software and/or hardware in a suitable combination and operable to communicate with network 108. More specifically, interface 136 may comprise software supporting one or more communications protocols associated with communications network 108 or hardware operable to communicate physical signals.

Network 108 facilitate wireless or wireline communication between server 106 and any other local or remote computer, such as clients 102. Network 108 may be all or a portion of an enterprise or secured network. While illustrated as single network, network 108 may be a continuous network logically divided into various sub-nets or virtual networks without departing from the scope of this disclosure, so long as at least portion of network 108 may facilitate communications of assets 111, template selections 112, and/or publication selections 113 between server 106 and at least one client 102. In some implementations, network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, the client 102 transmits, to the ad server 106, a request to create one or more advertisements for a publication. In some implementations, the user may be an advertiser, an individual, an enterprise, and/or other entity. In response to at least the request, the ad server 106 transmits one or more Web pages 128 that at least request information associated with the advertising campaign. For example, the Web page 128 may be a form request assets such as text assets (e.g., company name, address, contact information), image assets (e.g., logo, product/service image), and/or other assets. In addition, the Web page 128 may request one or more selections from the user. For example, the Web page 128 may request an ad size, publication, template layout, and/or other information. For example, the client 102 may transmit a request to generate ads in a form compatible with one or more selected publications. Based, at least in part, on the received information including the selections, the request engine 132 may generate and/or update one or more asset profiles 120 associated with the user. For example, the request engine 132 may store received assets, selected template profiles 122, publications, ad sizes, a live area of an image asset, indication of user-specified cropping and/or scaling rules, and/or other information. During this process, the request engine 132 may determine or otherwise identify information in the publication profiles 124. For example, the request engine 132 may identify information associated with available ad slots for one or more publications.

Turning to generating ads 126, the ad engine 134 automatically generates one or more ads 126 based, at least in part, on the received assets. The ad engine 134 may identify one or more template profiles 122 selected by the user and map or otherwise associate the received assets to fields in the template profiles 122. For example, the contact information may be mapped to corresponding fields in the template profiles 122. In connection with generating the ads 126, the ad engine 134 may implement one or more transformative rules to the received assets prior to populating the template profiles 122. For example, the ad engine 134 may modify the font of text assets such as type size, bold, and/or other attributes. The ad engine 134 automatically populates the template profiles 122 based, at least in part, on the received assets to generate one or more ads 126. As previously mentioned, each ad 126 may be associated with an ad size, a publication, and/or other aspect of advertising in print media. In some implementations, the ad engine 134 transmit sample ads to the client 102 for modifications and/or selections. For example, the user may adjust the appearance of the ad by modifying text assets and/or image cropping, scaling, and live area rules. In response to receiving updated ads from the user, the ad engine 134 may generate one or more ads 126 based, at least in part, on any adjustments and/or modifications made by the user. In addition, the user may request that a previously generated ad 126 be modified for a different publication and/or ad slot. In this case, the ad engine 134 may receive information for generating a new ad 126 such as publication, ad size, and/or other aspects. In response to at least the information, the ad engine 134 automatically modifies the assets in the previously generated ad 126 and then populates one or more template profiles 122 in accordance with the user selections.

FIGS. 2A to 2E are a series of example web pages 128. It will be understood that the illustrated pages are for example purposes only. Accordingly, GUI 110 may include or present information in any format or descriptive language, and each page may present any appropriate advertising information in any layout without departing from the scope of the disclosure.

In the illustrated implementation, FIG. 2A illustrates a web page 128 for presenting an identification of selected publications in addition to ad sizes and other information related to creating ads for each selected publication. Web page 128 includes a table 202, information fields 204 and 206, an ad identifier 207, an edit ad link 208 and a create-ad-now link 210. In the example, the top row of table 202 presents headings ("Newspaper", "Ad size", "Issue dates", "Ads", and "Options") for each row in the table 202. Each row below the top row of table 202 displays data for one selected publication. Information field 204 indicates that in the example, The Boston Globe is one of the selected publications for which the user would like to create ads, and the second row of table 202 displays information regarding ads for The Boston Globe. Information field 204 also indicates that the ad will run in the "Travel" section on Sundays and Wednesdays. Information field 206 indicates that in the illustrated example, the user has chosen to create a 2 column by 3.5 inch ad for The Boston Globe. Information field 206 equivalently indicates the selected ad size in inches (3.79 inches by 3.5 inches), according to the publication profile associated with The Boston Globe. Ad identifier 207 identifies ad 126 "Cruise.com.pdf" which has been generated for The Boston Globe. Edit ad link 208 may allow the user to modify existing ad 126 "Cruise.com.pdf." Create ad now link 208 may allow the user to directly create an ad of appropriate size for The Houston Chronicle based, at least in part, on the asset profile 120 and the template profile 122 used to generate existing ad 126 "Cruise.com.pdf" for The Boston Globe.

Turning to the remainder of web page 128, links to instructional material and common questions are included above table 202. The "Issue Dates" column of table 202 indicates when created ads may be published in the selected publication. For example, the ad 126 "Cruise.com.pdf" is associated with the issue dates "November 16-30". Finally, the "Options" column of table 202 displays links to various functional features of the system 100, such as editing and creating ads. For example, create ad now link 208 may allow a user to create ads directly with only a single mouse click. Create ad now links 208 may automatically adjust and repurpose ads for a plurality of publication formats and size specifications without the user having to manually adjust and format multiple ads.

In the illustrated implementation, FIG. 2B illustrates a web page 128 for uploading assets to the ad server 106. Web page 128 includes text asset fields 212, contact asset fields 214, and image asset fields 216. Each field includes a label (e.g. "Headline") and a data entry interface, such as a text entry area or a pull-down menu. Illustrated text asset fields 212 include "Headline", "Company name", and "Body text (short)", "Body text (medium)", and "Body text (long)". Illustrated contact asset fields 214 include "Primary contact" and associated "http://" as well as "Secondary contact" and associated "http://". Illustrated image asset fields 216 include fields for uploading a company logo and one other image. Turning to the remainder of web page 128, above the text asset fields 212 there is an "Ad name" field for naming an ad 126. Above the "Ad name" field is instructional material.

Figure 2C:
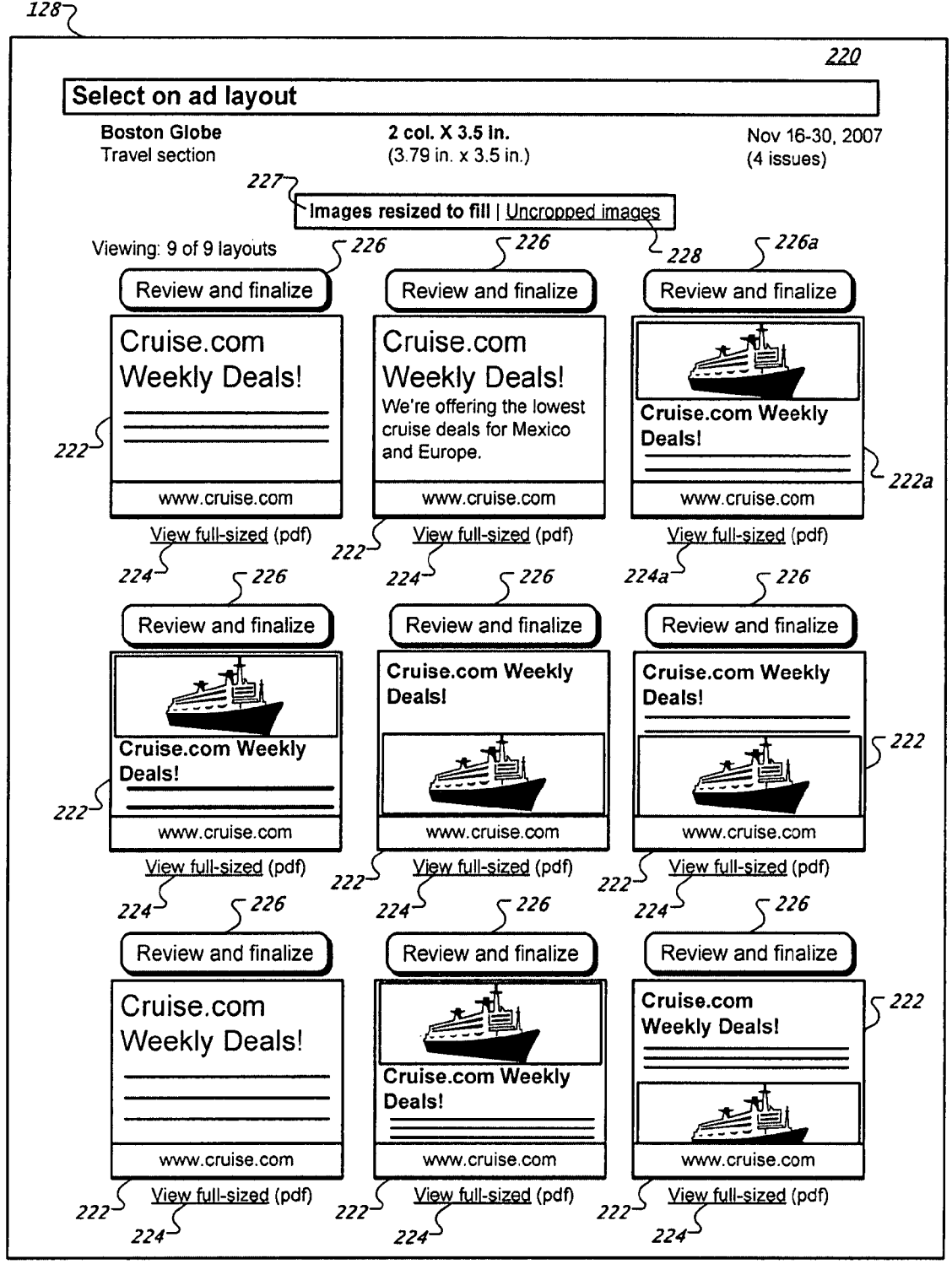

In the illustrated implementation, FIG. 2C illustrates a web page 128 for presenting a plurality of templates populated according to associated template profiles 124 with assets included in asset profile 120. Web page 128 includes nine populated templates 222 arranged in a 3×3 matrix 220. In the proximity of each populated template 222 is a view full-sized link 224 and a review and finalize link 226. At the top of the page is a text 227 and an uncropped images link 228. Each populated template 222 includes assets from an asset profile 120 arranged, sized, oriented, and formatted according to a different template profile 122. For example, populated template 222a includes an image asset, a headline, and body text. Other illustrated populated templates 222 include different arrangements of the same and/or different assets. A view full-sized link 224 may allow the user to preview a full-sized ad 126 generated using the associated template. For example view full-sized link 224a may allow the user to view a PDF formatted sample of an ad 126 generated using asset profile 120 and the template profile 122 associated with populated template 222a and the asset profile 120. The review and finalize link 226 may allow the user to preview an ad 126 generated using asset profile 120 and the template profile 120 associated with populated template 222 and may present options for editing assets previously entered, modifying the appearance of image assets, and/or generating an ad 126. The text 227 indicates that the populated templates 222 were populated by resizing (e.g. scaling) image assets to fill an area of specific size. The uncropped images link 228 allows the user to repopulate each template using uncropped images. Finally, displayed above text 227 and link 228 is information about the ad being created, such as the specified publication and ad size.

Figure 2D:
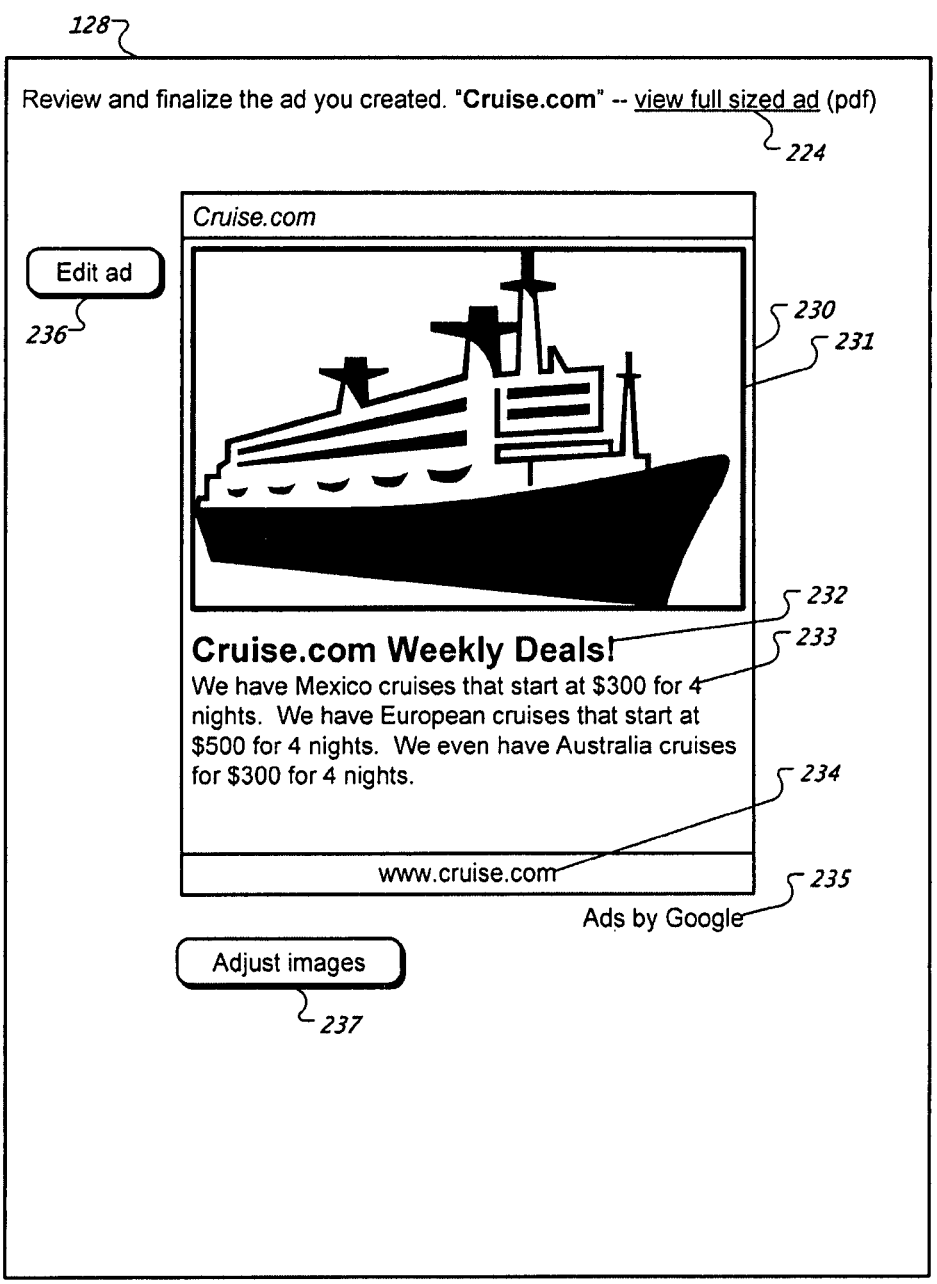

In the illustrated implementation, FIG. 2D illustrates a web page 128 for previewing an ad 126 generated using a selected template profile 122, and for presenting options to edit assets previously entered, modify the appearance of image assets, and/or generate an ad 126. Web page 128 includes view full-sized link 224, ad preview 230, edit ad button 236, and adjust images button 237. The ad preview 230 displays assets from an asset profile 120 arranged, sized, oriented, and formatted according to a selected template profile 122. For example, the illustrated ad preview 230 corresponds to populated template 222a of FIG. 2C. In the present example, the web page 128 of FIG. 2D may be accessed from review and finalize link 226a of FIG. 2C. The ad preview 230 includes an image asset 231, a headline text asset 232, a body text asset 233, a contact information text asset 234, and a branding 235. The assets 231-234 may correspond to information entered by the user in the asset fields in the web page 128 of FIG. 2B. Branding 235 may be included in the ad when the ad is generated by ad engine 134. The edit ad button 232 allows the user to edit ad assets previously entered, therein modifying the asset profile 120. Edit ad button 232 may direct the user to a web page 128 as in FIG. 2B where asset information may be entered and/or modified. For example, the user may click the edit ad button 232 in order to change the contact information or the headline. The adjust images button 237 allows the user to adjust the appearance of image assets. For example, the user may click the adjust images button 237 in order to crop and/or scale image asset 231.

Figure 2E:
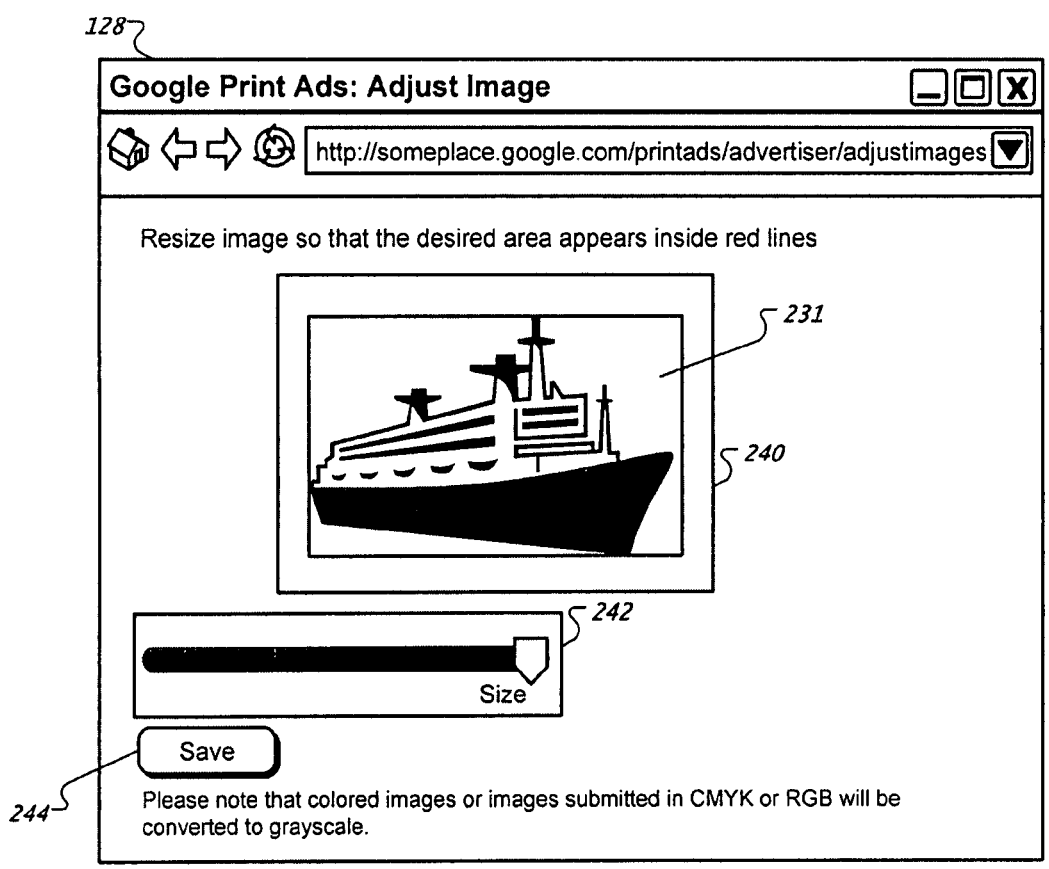

In the illustrated implementation, FIG. 2E illustrates a web page 128 for adjusting the appearance of image assets. For example, clicking the adjust images button 237 in web page 128 of FIG. 2D may direct the user to web page 128 of FIG. 2E. Web page 128 includes image asset 231, crop box 240, scaling slider 242 and save button 244. The crop box 240 indicates where the image asset 231 will be cropped. The size of the crop box is determined by the template profile 122 in accordance with the ad size specified by publication profile 124. In the illustrated example, the image asset 231 is smaller than the crop box 240, and therefore the image asset 231 will not be cropped. Scaling slider 242 allows the user to adjust the size of the image asset 231 with respect to the crop box 240. For example, moving slider 242 to the left may reduce the size of image asset 231, while moving slider 242 to the right may increase the size of image asset 231. Save button 244 may store the image adjustment setting in asset profile 120 and direct the user to an updated preview as in web page 128 of FIG. 2D.

FIG. 3 is a flow chart illustrating an example method 300 for automatically generating ads in accordance with some implementations of the present disclosure. In general, the method 300 describes for automatically generating printed ads for different publications using user assets. Method 300 contemplates using any appropriate combination and arrangement of logical elements implementing some or all of the described functionality.

At a high level, the method 300 includes two processes: (1) receiving information, e.g., from the user, including assets and selections at steps 302 to 308; and (2) automatically generating the ads at steps 310 to 320. Method 300 begins with step 302 where an a request to generate ads is received. For example, the client 102 may transmit a request to the ad server 106 to initiate an ad campaign including different publications. At step 304, a request for information associated with the ad campaign is transmitted to the user. In the example, the request engine 132 may transmit one or more Web pages 128 that request information such as assets as well as selections associates with the ad campaign (e.g., ad size, publications). Next at step 306, ad assets are identified using the received information. As for the example, the request engine 132 may identify a company name, a contact information and a product image based, at least in part, on the received information. Templates for ads are identified at step 308 using the received information. Returning to the example, the request engine 132 may identify one or more template profiles 122 selected by the user.

Turning to the ad generation process, ads compatible with one or more publications are generated at step 310. For example, the ad engine 134 may generate one or more ads 126 based, at least in part, on the user assets and the selected templates 122. At step 312, the generated ads are transmitted to the user. As for the example, the ad engine 134 may transmit the initially generated ads 126 to the client 102 for evaluation by the user. Next, at step 314, one or more selections are received from the user. In the example, the ad engine 134 may receive a selection of one or more of the presented ads 126. If a modification of one or more ads are received at decisional step 316, then, at step 318, the one or more ads are modified according to user instructions. If no modifications are received at decisional step 316, then execution proceeds to step 320 where the selected ads are finalized for one or more publications. Again in the example, the ad engine 134 may generate PDFs of the selected ads 126 that are compatible with one or more publications.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for incorporating at least a portion of an image element specified by an advertiser that must be displayed, comprising:

receiving, by a computer system from the advertiser, advertisement elements for an advertisement to be presented in at least one printed publication selected by the advertiser, wherein each of the at least one printed publication selected by the advertiser is associated with a respective publication profile specifying one or more attributes associated with one or more ad slots in the at least one printed publication selected by the advertiser, and the advertisement elements include a text element and the image element, the image element comprising a live area, wherein the live area of the image element comprises at least a portion of the image element specified by the advertiser that must be displayed;

presenting, by the computer system to the advertiser, a plurality of selectable advertisement templates for generating advertisements ("ads"), wherein each of the plurality of selectable advertisement templates;

(i) defines at least an arrangement of the advertisement elements in an advertisement, and (ii) is associated with the one or more ad slots in the at least one printed publication selected by the advertiser, in accordance with the one or more attributes specified by the respective publication profile associated with each of the at least one printed publication selected by the advertiser;

receiving a selection from the advertiser of at least one advertisement template from the plurality of selectable advertisement templates;

for each selected advertisement template:

determining whether only a portion of the image element can be displayed with the selected advertisement template and upon determining that only a portion of the image can be displayed with the selected advertisement template;

automatically generating, by the computer system, an advertisement based on the selected advertisement template and the advertisement elements, such that the generated advertisement;

(I) is compatible with the one or more ad slots in the at least one printed publication selected by the advertiser, and (II) displays at least the portion of the image element specified by the advertiser that must be displayed;

providing the generated advertisement to the advertiser via a graphical user interface for modification of the advertisement elements;

receiving, by the computer system from the advertiser, modifications to the advertisement elements of the generated advertisement;

generating, by the computer system, a revised advertisement for the at least one printed publication selected by the advertiser based on the modified advertisement elements;

receiving, by the computer system from the advertiser, a selection of one or more of the revised advertisements for presentation in the at least one printed publication selected by the advertiser; and submitting, by the computer system, the selected one or more of the revised advertisements to the at least one printed publication selected by the advertiser.

2. The method of claim 1, further comprising:

presenting, by the computer system to the advertiser, identifiers of a plurality of publications; and receiving, by the computer system from the advertiser, a selection of the at least one printed publication from among the plurality of publications in which the advertisement will be presented, wherein each of the generated advertisements are compatible with the at least one printed publication selected by the advertiser.

3. The method of claim 1, wherein said automatically generating the advertisement comprises:

automatically modifying attributes of the advertisement elements based on transformation rules associated with the selected advertisement template, wherein the transformation rules include rules for modifying the image element associated with the advertisement based on a range of ad sizes, such that the at least the portion of the image element specified by the advertiser that must be displayed is displayed within the range of ad sizes; and automatically populating the selected advertisement template with the modified advertisement elements based, at least in part, on the one or more ad slots associated with the at least one printed publication, such that the populated advertisement template displays at least the portion of the image element specified by the advertiser that must be displayed associated with the generated advertisement.

4. The method of claim 1, wherein said automatically generating an advertisement comprises automatically formatting parameters of the advertisement elements in accordance with specifications associated with the at least one publication.

5. The method of claim 1, further comprising:

receiving a request to modify one or more attributes of one or more generated advertisements; and automatically modifying the one or more attributes of the one or more generated advertisements in accordance with the request; and presenting the modified advertisements to the graphical user interface.

6. A method for incorporating at least a portion of an image element specified by an advertiser that must be displayed, comprising:

receiving, by a computer system from the advertiser, advertisement elements for an advertisement to be presented in print media, wherein the advertisement elements include a text element and an image element, the image element comprising a live area, wherein the live area of the image element comprises at least a portion of the image element specified by the advertiser that must be displayed in the advertisement;

receiving, by the computer system from the advertiser, a selection of at least one printed publication for presenting an advertisement generated based on the advertisement elements: wherein each of the at least one printed publication selected by the advertiser is associated with a respective publication profile specifying one or more attributes associated with one or more ad slots in the at least one printed publication selected by the advertiser;

identifying, by the computer system, one or more templates defining attributes of an advertisement compatible with print media and with the at least one printed publication, wherein each of the one or more templates are associated with one or more ad slots in the at least one printed publication selected by the advertiser, in accordance with the one or more attributes specified by the respective publication profile associated with each of the at least one printed publication selected by the advertiser;

for each identified template:

determining whether only a portion of the image element can be displayed with the selected advertisement template and upon determining that only a portion of the image can be displayed with the selected advertisement template;

automatically populating, by the computer system, the template based, at least in part, on the advertisement elements to generate one or more ads for the at least one printed publication, such that the populated template displays at least the portion of the image element specified by the advertiser that must be displayed;

providing the populated template to the advertiser via a graphical user interface for modification of the advertisement elements by the advertiser; and receiving, by the computer system from the advertiser, modifications to the advertisement elements;

providing, to the advertiser, the populated template including the modified advertisement elements to the graphical user interface; and receiving a selection of at least one populated template for submission as an advertisement to the at least one printed publication; and submitting, by the computer system, the advertisement corresponding to the selection of the at least one populated template to the at least one printed publication selected by the advertiser.

7. The method of claim 6, further comprising:

for each identified template:
  identifying, by the computer system, transformation rules for the advertisement elements; and
  modifying, by the computer system, the advertisement elements in accordance with the identified transformation rules.

8. A non-transitory computer readable storage medium encoded with a computer program, the computer program comprising instructions that, when executed, operate to cause a computer to perform operations for incorporating at least a portion of an image element specified by an advertiser that must be displayed comprising:

receiving, from an advertiser, advertisement elements for the advertisement to be presented in at least one printed publication selected by the advertiser, wherein each of the at least one printed publication selected by the advertiser is associated with a respective publication profile specifying one or more attributes associated with one or more ad slots in the at least one printed publication selected by the advertiser, and the advertisement elements include a text element and the image element, the image element comprising a live area, wherein the live area of the image element comprises at least a portion of the image element specified by the advertiser that must be displayed;

presenting, to the advertiser, a plurality of selectable templates for generating ads to a graphical user interface, wherein each of the plurality of selectable ad templates (i) defines at least an arrangement of advertisement elements in an advertisement, and (ii) is associated with the one or more ad slots in the at least one printed publication selected by the advertiser, in accordance with the one or more attributes specified by the respective publication profile associated with each of the at least one printed publication selected by the advertiser;

receiving modifications of at least one advertisement element from the advertiser via the graphical user interface;

presenting each of the plurality of selectable ad templates including the modified at least one advertisement element to the graphical user interface;

receiving, from an advertiser, a selection of an ad template from the plurality of selectable ad templates including the at least one modified advertisement element;

determining whether only a portion of the image element can be displayed with the selected advertisement template and upon determining that only a portion of the image can be displayed with the selected advertisement template;

automatically generating one or more ads compatible with ad slots in the at least one publication based, at least in part, on the advertisement elements and the selected ad template such that each advertisement of the automatically generated ads displays at least the portion of the image element specified by the advertiser that must be displayed providing the generated advertisement to the advertiser via a graphical user interface for modification of the advertisement elements.

9. The non-transitory computer readable storage medium of claim 8, wherein the operations comprise, for each selectable ad template:

automatically modifying advertisement elements based on transformation rules associated with the selectable ad template, wherein the transformation rules include rules for modifying the image associated with the advertisement based on a range of ad sizes, such that at least the portion of the image element specified by the advertiser that must be displayed is displayed within the range of ad sizes; and automatically populating the selectable ad template with the modified advertisement elements based, at least in part, on the one or more ad slots associated with the at least one printed publication, such that the populated ad template displays the live area of the image associated with the generated advertisement.

10. The non-transitory computer readable storage medium of claim 9, wherein the operation of automatically generating the one or more ads comprises automatically formatting parameters of the advertisement elements in accordance with specifications associated with the at least one publication.

11. The non-transitory computer readable storage medium of claim 8, wherein the operations comprise:

receiving a request to modify one or more attributes of the one or more generated ads; and automatically modifying the one or more attributes of the one or more generated ads in accordance with the request.

* * * * *

UNITED STATES PATENT AND TRADEMARK OFFICE
CERTIFICATE OF CORRECTION

| | | |
|---|---|---|
| PATENT NO. | : 8,583,488 B2 | Page 1 of 1 |
| APPLICATION NO. | : 11/856437 | |
| DATED | : November 12, 2013 | |
| INVENTOR(S) | : Joseph Janos et al. | |

It is certified that error appears in the above-identified patent and that said Letters Patent is hereby corrected as shown below:

In the Claims

Column 14, line 41, delete "elements:" and insert -- elements, -- therefor.

Signed and Sealed this
Fifteenth Day of April, 2014

Michelle K. Lee
*Deputy Director of the United States Patent and Trademark Office*